(12) United States Patent
Elliott (10) Patent No.: US 11,686,642 B2
(45) Date of Patent: Jun. 27, 2023

(54) THERMAL MONITORING SYSTEM FOR TEMPERATURE-SENSITIVE STORAGE CONTAINERS

(71) Applicant: CRYO SENTINEL LLC, Alpharetta, GA (US)

(72) Inventor: Thomas Elliott, Atlanta, GA (US)

(73) Assignee: Cryo Sentinel LLC, Alpharetta, GA (US)

( * ) Notice: Subject to any disclaimer, the term of this patent is extended or adjusted under 35 U.S.C. 154(b) by 532 days.

(21) Appl. No.: 17/013,188

(22) Filed: Sep. 4, 2020

(65) Prior Publication Data

US 2021/0072109 A1    Mar. 11, 2021

Related U.S. Application Data

(60) Provisional application No. 62/898,176, filed on Sep. 10, 2019.

(51) Int. Cl.
*G01M 3/00* (2006.01)
*G01J 5/00* (2022.01)
(Continued)

(52) U.S. Cl.
CPC ............. *G01M 3/002* (2013.01); *G01J 5/00* (2013.01); *G08B 7/06* (2013.01); *G01J 5/48* (2013.01); *G01J 2005/0077* (2013.01)

(58) Field of Classification Search
None
See application file for complete search history.

(56) References Cited

U.S. PATENT DOCUMENTS

D805,572 S  *  12/2017  Högstedt ................ D16/206
10,003,754 B2 *  6/2018  Ghetler .............. G01N 21/9501
(Continued)

FOREIGN PATENT DOCUMENTS

WO    2021050624    3/2021

OTHER PUBLICATIONS

Traceable Products; Article entitled: "New Products: Cover your Cryo needs for sensitive, irreplaceable biologicals!", located at <https://www.traceable.com/product-updates/In2>, published Jul. 11, 2017, 3 pgs.

(Continued)

*Primary Examiner* — Fekadeselassie Girma
(74) *Attorney, Agent, or Firm* — Taylor English Duma LLP (57) ABSTRACT

Example aspects of a thermal monitoring system are disclosed. The thermal monitoring system can comprise a cryogenic storage container comprising an external wall and an internal wall, wherein a cold cryogenic liquid is housed within the internal wall, and wherein a vacuum is formed between the external wall and the internal wall; a thermal imaging camera configured to measure temperatures within a region of interest, wherein the cryogenic storage container is oriented within the region of interest and the thermal imaging camera measures an external temperature of the outer wall of the cryogenic storage container, the thermal imaging camera further comprising camera software configured to generate a thermographic video of the external temperature; a display device displaying the thermographic video; and an alarm unit configured to activate an alert when the external temperature of the cryogenic storage container drops below a pre-selected trigger temperature.

21 Claims, 7 Drawing Sheets

(51) Int. Cl.
*G08B 7/06* (2006.01)
*G01J 5/48* (2022.01)

(56) References Cited

U.S. PATENT DOCUMENTS

| | | | |
|---|---|---|---|
| D880,559 S * | 4/2020 | Lin | D16/206 |
| 10,809,159 B2 * | 10/2020 | Neeley | H04N 5/33 |
| 2003/0011701 A1 | 1/2003 | Nilson et al. | |
| 2006/0086815 A1 * | 4/2006 | Kang | G01J 5/0003 |
| | | | 236/94 |
| 2006/0220888 A1 | 10/2006 | Germouni et al. | |
| 2012/0271477 A1 | 10/2012 | Okubo et al. | |
| 2014/0028854 A1 | 1/2014 | Heinke et al. | |
| 2014/0267768 A1 * | 9/2014 | Burleigh | H04N 5/33 |
| | | | 348/165 |
| 2016/0237992 A1 * | 8/2016 | Chicoski | F03G 3/00 |
| 2021/0072109 A1 * | 3/2021 | Elliott | G01J 5/0003 |
| 2021/0325251 A1 * | 10/2021 | Maeda | G09G 5/026 |

OTHER PUBLICATIONS

Elliott, Thomas; International Search Report and Written Opinion for PCT Application No. PCT/US20/50044, filed Sep. 10, 2020, dated Nov. 27, 2020, 10 pgs.

* cited by examiner

THERMAL MONITORING SYSTEM FOR TEMPERATURE-SENSITIVE STORAGE CONTAINERS

CROSS-REFERENCE TO RELATED APPLICATIONS

The present application claims the benefit of U.S. Provisional Application No. 62/898,176, filed Sep. 10, 2019, which is hereby specifically incorporated by reference herein in its entirety.

TECHNICAL FIELD

This disclosure relates to temperature-sensitive storage. More specifically, this disclosure relates to a thermal monitoring system for temperature-sensitive storage containers.

BACKGROUND

Cryogenic storage is used in many fields for the long-term safe keeping of biological samples. In the in vitro fertilization industry, these biological samples can include eggs, sperm, and embryos.

Unfortunately, cryogenic storage containers are not perfect and can sometimes fail leading to catastrophic loss of the stored samples.

Cryogenic storage typically involves using a very cold cryogenic liquid, usually liquid nitrogen, to store samples in a state that can remain unchanged for very long periods of time. The cryogenic storage containers typically comprise an outer wall and an inner wall with a vacuum between them. This vacuum inhibits the transfer of heat, thus making the containers suitable for holding and maintaining the cryogenic liquid and stored samples.

In the case of vacuum failure, the cryogenic container can no longer hold the temperature and the cryogenic liquid inside the container starts to boil and turn to gas. Over time, the gas escapes, leaving the container empty. With no cryogenic liquid, the cryogenic container starts to warm and the stored samples can become compromised or destroyed.

Monitoring systems already exist for cryogenic containers and usually involve a temperature probe that sits inside the cryogenic container. The probe can detect the temperature difference between the cryogenic liquid phase and the gaseous phase under regular operating conditions. Unfortunately, when a cryogenic storage container fails catastrophically, and the vacuum is lost, the liquid boils with such intensity that the internal gas is super-cooled. As the gas is super-cooled, and is a much lower temperature than the normal gas phase, the temperature differential is often not detected before it is too late and the stored samples are lost. Therefore, in the case of sudden cryogenic storage container failure due to loss of vacuum, this internal probe method is useless.

False alarms are also common with these systems as sensors often breakdown due to the ultra cold temperatures. Additionally, it is necessary for each cryogenic storage container to have a separate temperature sensor. Wireless communication between the sensor and main system is also often lost or batteries become depleted, with each of these situations resulting in an alarm. Too many false alerts can lead to alarm fatigue whereby users could ignore real alarms. Reducing unimportant or false alerts and overcoming alarm fatigue is a very important issue.

Another method of determining the amount of cryogenic liquid in a storage container is to measure its depth in various ways, such as with a floating switch or by measuring the dielectric constants of liquid and gaseous nitrogen. These systems alert users if the level of nitrogen drops below a set point. However, these systems also require a separate sensor for each cryogenic storage container and can still be unreliable and/or expensive, and prone to issues associated with very cold temperatures, including ice buildup and thermal stress. Additionally, in the event of a container failure, it can take awhile for the cryogenic liquid to drop to a level that would trigger an alarm, which wastes precious time in these situations and limits the time available to take action.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a thermal monitoring system for monitoring for vacuum failure in a cryogenic storage container, the thermal monitoring system comprising a cryogenic storage container comprising an external wall and an internal wall, wherein a cold cryogenic liquid is housed within the internal wall, and wherein a vacuum is formed between the external wall and the internal wall; a thermal imaging camera configured to measure temperatures within a region of interest, wherein the cryogenic storage container is oriented within the region of interest and the thermal imaging camera measures an external temperature of the outer wall of the cryogenic storage container, the thermal imaging camera further comprising camera software configured to generate a thermographic video of the external temperature; a display device displaying the thermographic video; and an alarm unit configured to activate an alert when the external temperature of the cryogenic storage container drops below a pre-selected trigger temperature.

Also disclosed is a method of monitoring a cryogenic storage container for vacuum failure, the method comprising placing a cryogenic storage container within a field of view of a thermal imaging camera, the cryogenic storage container comprising an external wall, an internal wall, and a vacuum formed therebetween; measuring temperatures within the field of view with the thermal imaging camera, wherein the temperatures include an external temperature of the cryogenic storage container; generating signals indicative of the detected temperatures with the thermal imaging camera; transferring the signals to the alarm unit; and activating an alert with an alarm unit when the external temperature of the cryogenic storage container drops below a pre-selected trigger temperature.

Disclosed is a thermal monitoring system for monitoring for vacuum failure in a cryogenic storage container, the thermal monitoring system comprising a cryogenic storage container comprising an external wall, an internal wall, and a vacuum formed therebetween; a thermal imaging camera comprising a sensor and camera software, the sensor configured to detect infrared light within a field of view, wherein the cryogenic storage container is positioned within the field of view and the infrared light includes infrared light emitted by the external wall of the cryogenic storage container, the camera software configured process the infrared light data to measure an external temperature of the external wall; and an alarm unit configured to activate an alert when the external temperature of the cryogenic storage container drops below a pre-selected trigger temperature Disclosed is a thermal monitoring system for monitoring for vacuum failure in a cryogenic storage container, the thermal monitoring system comprising a thermal imaging camera(s)/sensor(s) to monitor temperature within its field of view or area of interest as determined during set up. The output from the thermal camera(s)/sensor(s) can optionally be viewed on a local monitor. If the minimum temperature drops below a predetermined threshold, an alarm state can be triggered. The alarm state starts a chain of events to make personnel aware that an issue has been detected. These alerts can include, but are not limited to, a siren or horn, strobe light or similar warning light, email, text messaging or phone call. Additionally, a live video feed or images from the thermal imaging camera(s)/sensor(s) are available through a network or the Internet for remote viewing on computers or mobile devices.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

The terminology used herein is for the purpose of describing particular aspects only and is not intended to be limiting of the invention. As used herein, the term "and/or" includes any and all combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A novel monitoring system using thermal imaging and non-contact temperature measurements is disclosed herein, along with associated methods, systems, devices, and various apparatus. In the following description, for purposes of explanation, numerous specific details are set forth in order to provide a thorough understanding of the present invention. It will be evident, however, to one skilled in the art that the present thermal monitoring system is described in but a few exemplary aspects among many and may be practiced without these specific details. The present disclosure is to be considered as an exemplification of the invention, and is not intended to limit the invention to the specific embodiments illustrated by the figures or description below. No particular terminology or description should be considered limiting on the disclosure or the scope of any claims issuing therefrom.

Figure 1:
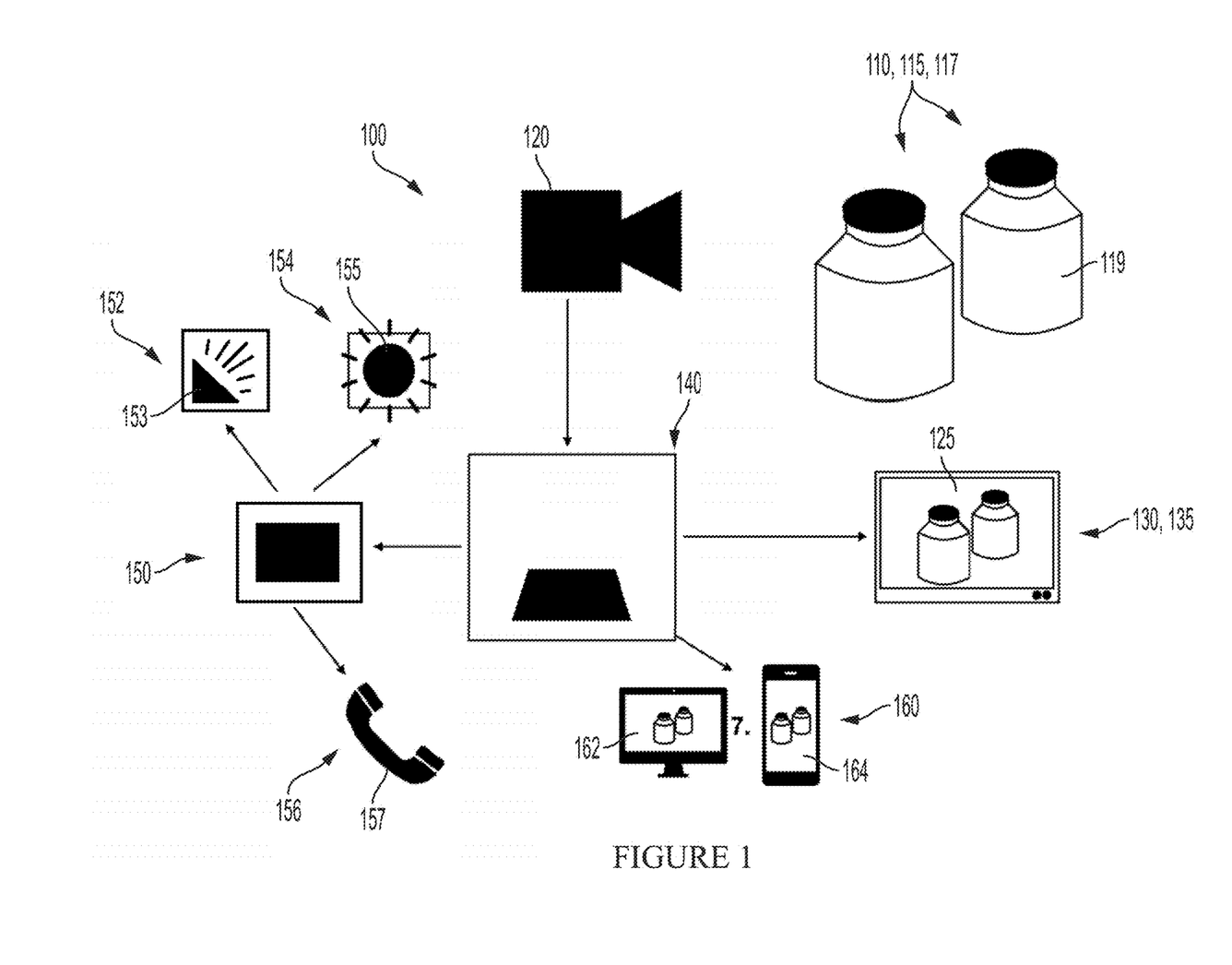
FIG. 1 is a diagram of a thermal monitoring system for monitoring cryogenic storage containers, in accordance with one aspect of the present disclosure.

FIG. 1 illustrates a thermal monitoring system 100 according to an example aspect of the present disclosure. The monitoring system 100 can be configured to monitor a temperature-sensitive storage container 110, such as a standard cryogenic storage container 115 or vessel, as shown. Example aspects of the cryogenic storage container 115 can be a cryogenic storage freezer or a cryogenic storage dewar 117, as shown. Temperature-sensitive materials, such as biological samples, can be housed with the temperature-sensitive storage container 110. There can be other shapes, sizes, and types of the temperature-sensitive storage containers 110, and the present monitoring system 100 can be applied to those containers 110 as well. According to example aspects, each of the cryogenic storage containers 115 can be a cryogenic storage dewar 117 comprising an outer wall 119 and an inner wall (not shown) with a vacuum formed therebetween. A cold cryogenic liquid, such as liquid nitrogen, can be stored within the inner wall, and the vacuum between the inner wall and outer wall 119 can inhibit the transfer of heat, such that the temperature of the cryogenic liquid housed within the inner wall can be maintained.

According to example aspects, the cryogenic storage containers 115 can be monitored individually or in a group. For example, as shown in the present aspect, two of the cryogenic storage containers 115 can be monitored by a thermal imaging camera 120, as shown, and/or a thermal sensor. In the present aspect, the thermal imaging camera 120 can be a FLIR AX8 thermal imaging camera 120, though in other aspects, the thermal imaging camera 120 can be any other suitable thermal imaging camera 120 known in the art. In the aspect of FIG. 1, two of the cryogenic storage containers 115 are monitored by the thermal imaging camera 120. In other aspects, more or fewer cryogenic storage containers 115 can be monitored by one or more of the thermal imaging cameras 120 and/or thermal sensors. According to example aspects, the thermal imaging camera 120 can comprise a sensor 122 configured to detect infrared light emitted by the cryogenic storage containers 115. In example aspects, the cryogenic storage containers 115 can comprise a material having a high emissivity (the measure of an object's ability to emit infrared energy). However, in other example aspects, some or all of the cryogenic storage containers 115 may have a low emissivity due to reflective properties of the material of the container 115—for example, the cryogenic storage container(s) 115 may comprise aluminum or stainless steel in some aspects. In such an aspect, the cryogenic storage container(s) 115 can be painted or otherwise coated with a paint or other material having a high emissivity in order to reduce the reflectivity of the container(s) 115 to make temperature information received by the thermal imaging camera 120(s) and/or sensor(s) more accurate and usable.

The thermal imaging camera 120 can provide a thermographic video 125 or thermographic image representative of a temperature of each of the cryogenic storage containers 115 within a field of view 230 (shown in FIG. 2) or a region(s) of interest 235 (shown in FIG. 2) within the field of view 230. In example aspects, the thermal imaging camera 120 can comprise camera software configured to process the detected infrared light to measure the temperatures within the field of view 230 or region of interest 235. The camera software can further be configured to generate the thermographic video 125 or image. The thermographic video 125 or image can be displayed on a display device 130 to be viewed by a user. According to example aspects, the field of view 230 or region(s) of interest 235 can be set by a user during setup of the monitoring system 100 by focusing/configuring the thermal imaging camera 120 on the desired cryogenic storage container(s) 115 to be monitored. In the present aspect, the thermal imaging camera 120 can be selectively focused by the user on one or more regions of interest 235 via the camera software. For example, in some aspects, the camera software can be connected to the Internet or a local network, and a user can access the camera software to select a desired region(s) of interest 235 through an app or website on a computer, mobile phone, or other Internet or network-enabled device. In other aspects, the thermal imaging camera 120 can be manually focused by manually adjusting a lens of the thermal imaging camera 120. In some aspects, focusing or configuring the thermal imaging camera 120 on a specific region (or regions) of interest 235 can allow the user to block out undesirable areas within the field of view 230, such as, for example, areas of no interest and/or areas that may falsely trigger the alarm unit 150 to send an alert. The monitoring system 100 can comprise a single thermal imaging camera 120 or multiple thermal imaging cameras 120 (and/or a single thermal sensor or multiple thermal sensors). In aspects wherein multiple thermal imaging cameras 120 are used, the multiple thermal imaging cameras 120 can be in the same room or same general area, or may be located in different rooms/areas. According to example aspects, the camera(s) 120 can be located anywhere with access to a network.

According to example aspects, the thermal imaging camera(s) 120 and/or sensor(s) can be mounted to a wall, ceiling, or any other suitable fixture in order to obtain the desired coverage of the temperature-sensitive storage containers 110 (e.g., the cryogenic storage containers 115). The thermal imaging camera(s) 120 and/or sensor(s) can also be positioned at a desired angle when mounted to give the desired view of the temperature-sensitive storage container 110(s).

In example aspects, the thermographic video 125 or image provided by the thermal imaging camera 120 can illustrate the temperature of each temperature-sensitive storage container 110. In some aspects, the temperatures can be represented by colors indicative of the temperatures. In the present aspect, a color scale 440 (shown in FIG. 4) can be provided in order to simplify the understanding of the temperature information being displayed for the observer. For example, the color scale 440 can indicate that cooler colors (e.g., blues, purples, and the like) can be representative of cool temperatures and warm colors (e.g., reds, yellows, oranges, and the like) can be representative of warmer temperatures. In other aspects, the color scale 440 can comprise any other suitable colors.

This visual representation of temperature in the form of the thermographic video 125 or image can be used to assess the overall health of the cryogenic storage containers 115 because, in some aspects, the first sign that the vacuum is failing can be the outer wall 119 cooling and thus appearing as a different color than the surrounding cryogenic storage containers 115 when displayed through the thermographic video 125 or image.

Figure 2:
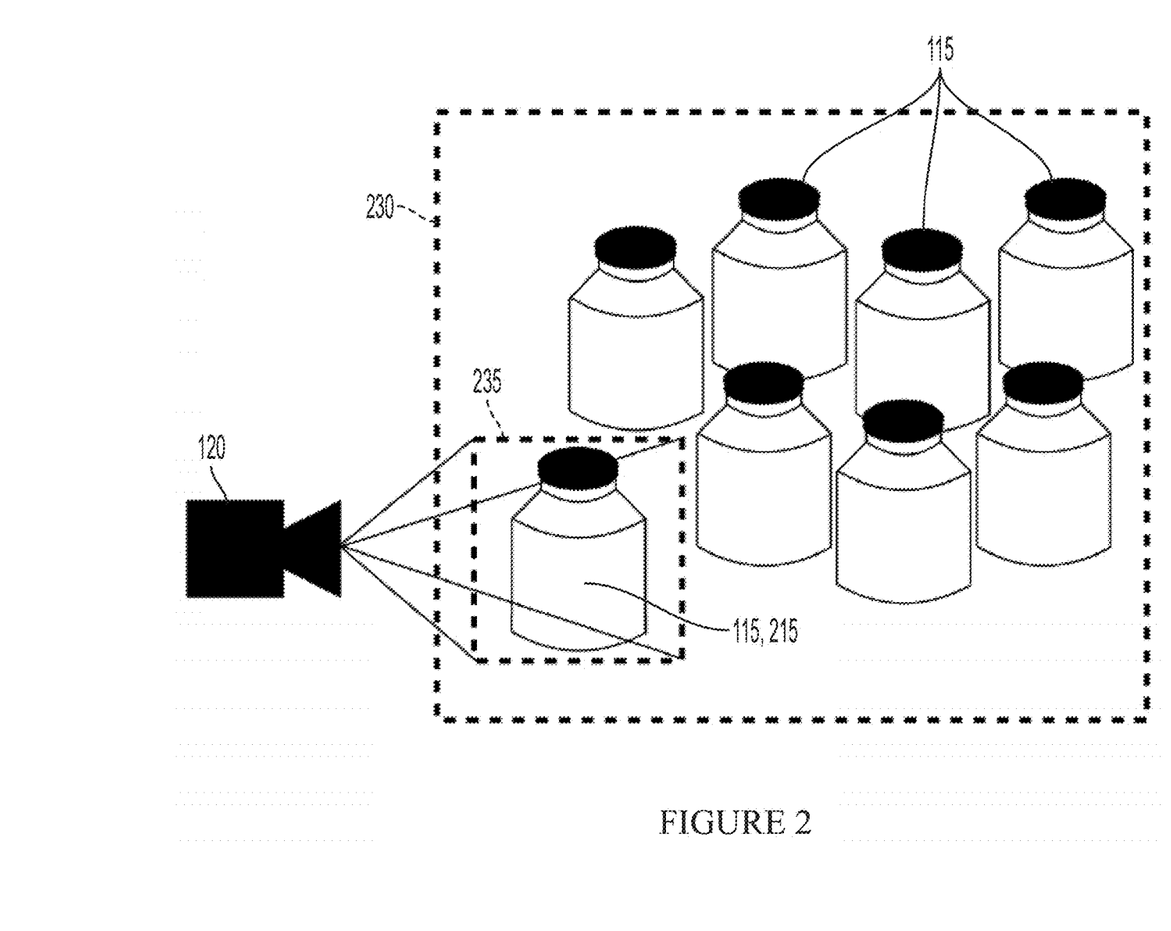
FIG. 2 is a diagram of a thermal imaging camera of the thermal monitoring system of FIG. 1 set to focus on some or all of the cryogenic storage containers of FIG. 1.

The thermographic video 125 or image can be displayed on the display device 130, which can be, for example, a TV screen 135, as shown, a computer monitor, an integrated computer/screen, a mobile phone, or any other suitable electronic device configured to provide the user a complete picture of the temperatures of the cryogenic storage containers 115 in the designated field of view 230 or region(s) of interest 235 (e.g., a room).

Figure 4:
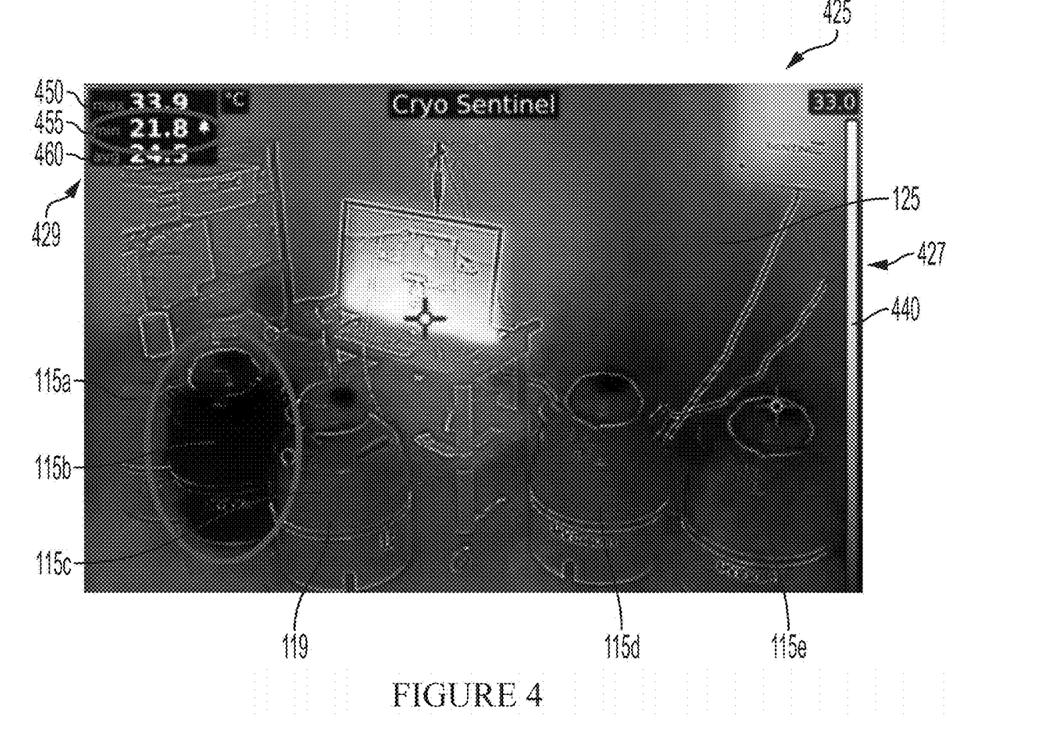
FIG. 4 is a color photograph of an image displayed at the monitoring station of FIG. 3.

In some example aspects, the thermal imaging camera(s) 120 and/or sensor(s) can detect specific temperature information including the maximum temperature 450 (shown in FIG. 4), minimum temperature 455 (shown in FIG. 4), and/or average temperature 460 (shown in FIG. 4) within the field of view 230 or region(s) of interest 235 of the thermal imaging camera(s) 120 and/or sensor(s). A processing unit 140 of the monitoring system 100 can be configured to receive the specific temperature information from the thermal imaging camera 120, and to process and report on the specific temperature information. For example, the maximum, minimum, and average temperatures 450,455,460 may be shown on the display device 130, as shown in FIG. 4.

According to example aspects, an alarm unit 150 can activate an alert when a temperature in the room, field of view 230, or region(s) of interest 235 reaches or falls below a pre-determined low trigger temperature. In other aspects, the alarm unit 150 can also or alternatively trigger an alert when a detected temperature reaches or rises above a pre-determined high trigger temperature. A user can select the pre-determined low trigger temperature, which, in the present aspect, can be lower than the usual external temperatures of the cryogenic storage containers 115 within the room, field of view 230 or region(s) of interest 235. According to example aspects, the pre-determined low trigger temperature can indicate a failure or pre-failure of the cryogenic storage container 115—for example, a failure or pre-failure of the vacuum between the inner wall and outer wall 119. As such, in some aspects, the monitoring system 100 can be configured to predict an impending failure or potential impending failure of the cryogenic storage container 115. When the vacuum fails or begins to fail, the outer wall 119 immediately cools and the cold temperature can be easily detectable by the thermal imaging camera 120. In some aspects, an algorithm that can create an alarm state if temperatures are detected that might indicate failure or pre-failure of the cryogenic storage container 115. If the detected temperature reaches or falls below the low trigger temperature, the alarm unit 150 can trigger the alert(s) can be activated. Furthermore, in some aspects, if the detected temperature reaches or rises above the high trigger temperature, the alarm unit 150 can also trigger the alert(s) can be activated. In example aspects, the low and/or high trigger temperatures can be set as any temperature outside of a desired temperature or temperature range of the temperature-sensitive containers 110, depending upon the application of the monitoring system 100. According to example aspects, there may be a single trigger temperature, such as the low trigger temperature, or multiple trigger temperatures, such as, for example, both the high trigger temperature higher than a desired temperature or temperature range and the low trigger temperature lower than the desired temperature or temperature range.

According to example aspects, various events, other than a cryogenic storage container 115 failing, may result in temperatures at or below the low trigger temperature, or at or above the high trigger temperature. For example, opening one of the cryogenic storage containers 115 to remove or add biological samples can release cold air into the environment, which may be at or below the low trigger temperature. As such, in some example aspects, the alarm unit 150 can be configured to operate on a predetermined time delay. For example, in a particular aspect, the alarm unit 150 can be configured to operate on a 1 hour time delay. In such an aspect, the alarm unit 150 will not trigger an alert immediately following the detection of a temperature at or below the low trigger temperature by the thermal imaging camera 120. Rather, the alarm unit 150 will delay triggering the alert until the end of the predetermined time delay (e.g., 1 hour), and will only trigger the alert if the detected temperature remains at or below the low trigger temperature (or at or above the high trigger temperature in some aspects). According to example aspects, a user can also visually monitor the thermographic video 125 or image for changes in color prior to the activation of an alert, as very minor temperature changes will be reflected in a change of color. In this way, the thermographic video 125 or image can visually warn a user of lower or higher than usual temperatures prior even when temperatures have not dropped below the lower trigger temperature or risen above the high trigger temperature. As such, the thermographic video 125 or image may provide a pre-emptive visual warning of potential vacuum failure above and beyond the alarm unit 150. Further, in some aspects, an artificial intelligence could be programmed or trained to visually monitor the thermographic video 125 or image for changes in color. Moreover, in some aspects, the thermal monitoring system 100 can be configured to compare the detected external temperatures of two or more of the cryogenic storage containers 115 in order to verify whether one of the containers 115 has experienced a failure.

The temperatures of the cryogenic storage containers 115, and the surrounding area within the field of view 230 or region(s) of interest 235, can be detected by the thermal imaging camera 120, and signals representing the temperature information can be passed from the thermal imaging camera 120 to the processing unit 140. In example aspects, the thermal imaging camera 120 (or thermal sensor) can be powered by a battery, another power source, or a power over Ethernet (POE) switch 540 (shown in FIG. 5). Furthermore, the method of transfer of the signals representing temperature information from the thermal imaging camera 120 to the processing unit 140 could be by cable(s) or wirelessly. In the present aspect, the signals are transferred through an Ethernet cable 550 (shown in FIG. 5), and the thermal imaging camera 120 can be powered through the Ethernet cable 550, and the power injected into the Ethernet cable can be controlled by the POE switch 540. In some aspects, the signals representing the temperature information received from the thermal imaging camera 120 may need to be translated so that circuitry of the alarm unit 150 can process and/or understand the signals. If the temperature information is translated, the translated temperature information may be translated to a 4-20 mA signal, a MODBUS signal, or any other suitable type of signal that can be recognized and processed by the alarm unit 150. The translation of the signals is described in further detail below. According to embodiments, the alarm unit 150 can be integrated into the monitoring system 100 or it can be a separate, third-party alarm unit.

If the signal from the thermal imaging camera 120 is at or below the low trigger temperature or at or above the high trigger temperature, the alarm unit 150 can activate the alert(s). In some example aspects, the alert can be expressed as a light, such as a strobe light 153, for example, or another suitable visual alert 152. Furthermore, in some example aspects, the alert can be expressed as an audio alert 154, such as a siren 155 or horn, or another audio device can be set to sound an audible noise. In some aspects, as shown in FIG. 1, the audio alert 154, such as the horn or siren 155, and the visual alert 152, such as the strobe light 153, can function together indicating a single alert, or can function independently indicating different alarm states. Moreover, in some aspects, the alarm unit 150 can be configured to send one or more communication alerts 156, such as phone calls, text messages, and/or email messages, directly to the user or users. For example, the communication alert(s) 156 can be sent to the user's telephone 157, computer, tablet, mobile device, or the like. The email message, text message, and/or phone call may contain enough information to determine the nature of the condition that triggered the alert, the location of the cryogenic storage container(s) 115 of concern, and other useful details. Additionally, in some aspects, certain alerts may be activated sooner than others. For example, in a particular aspect, the visual alert 152 (e.g., the strobe light 153) and/or audio alert 154 (e.g., the siren 155) can be activated before the communication alert(s) 156 is activated, to initially alert personnel in the vicinity of the alarm unit 150.

In addition to displaying the thermographic video 125 or image on the display device 130, as described above, example aspects of the monitoring system 100 can also provide a live video feed from the thermal imaging camera(s) 120 and/or thermal sensor(s) to the network and/or the Internet. Remotely, this live video feed can be observed on any internet-enabled device and/or network-connected device either through a web page, mobile app, or any other suitable mechanism known in the art that is able to transfer the thermographic video 125 or image data from the thermal imaging camera 120 to an internet-enabled device 160 and/or network-connected device. In example aspects, the internet-enabled device 160 and/or network-connected device can comprise a computer monitor 162, a mobile phone 164, a TV screen, and/or the like. In some aspects, the live feed can be viewed on multiple internet-enabled devices 160 and/or network-connected devices. Furthermore, in various example aspects, the monitoring system 100 can be configured to save copies the thermographic videos 125 or images to a network or electronic device, such as a computer 520 (shown in FIG. 5) for a period of time or indefinitely, and the saved copies of the thermographic videos 125 or images can be accessed and reviewed at a later time or date.

The monitoring system 100 is superior to other methods for monitoring or alarming systems for cryogenic storage containers 115 because it can provide thermograms (i.e., images representing variations in temperature) to study heat distribution. In example aspects, the thermal video 125 or image captured by the thermal imaging camera 120, including the maximum, minimum, and/or average temperatures 450,455,460 detected, can be seen locally on the display device 130 or remotely on the network-connected or internet-enabled device 160. Furthermore, none of the components of the monitoring system 100 come in contact with cryogenic liquid, so it is immune to the various issues that can affect other common sensors. The present monitoring system 100 can also be configured to monitor one or more cryogenic storage containers 115 at a time. Additionally, the present monitoring system 100 externally detects a temperature of the outer wall 119 of the cryogenic storage container 115, eliminating the possibility of damage caused by the harsh conditions in and around the cryogenic liquid. Monitoring the external temperature of a cryogenic storage container 115 can also provide faster detection of a failure than internal temperature measurement.

FIG. 2 illustrates how the thermal imaging camera 120 can be configured to monitor one or more of the cryogenic storage containers 115 in a particular region of interest 235 or the entire field of view 230 of the thermal imaging camera 120. In other aspects, the thermal imaging camera 120 can be configured to monitor multiple regions of interest 235 at once. As shown, the present aspect, the particular region of interest 235 can comprise a first one of the cryogenic storage containers 215, while the field of view 230 can comprise the first cryogenic storage container 215 as well as a plurality of additional cryogenic storage containers 115.

Figure 3:
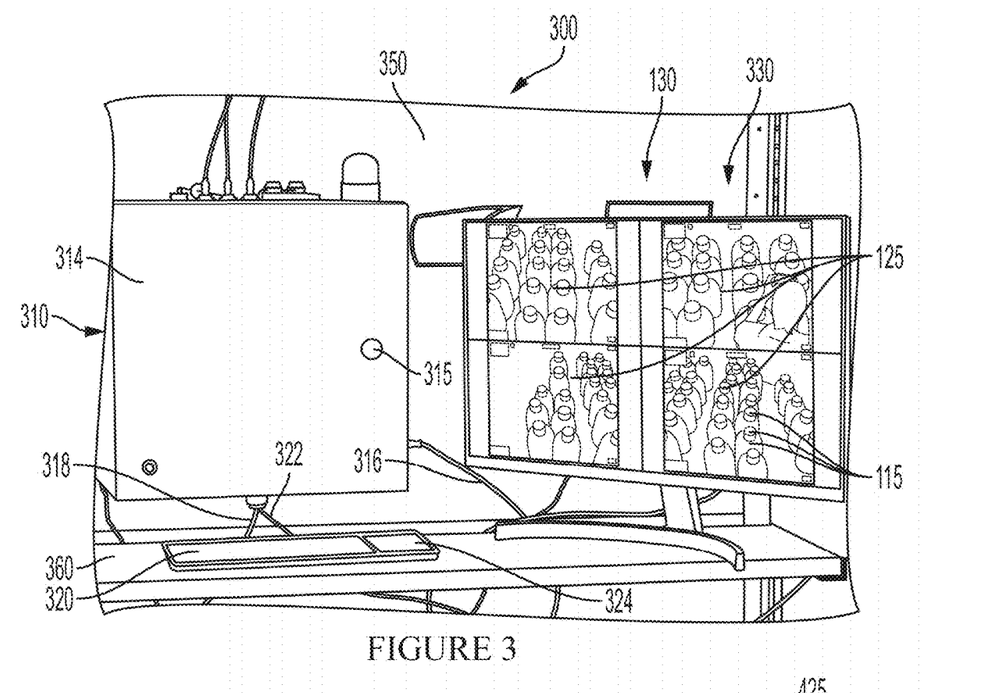
FIG. 3 is front view of a monitoring station comprising a monitor housing unit of the thermal monitoring system of FIG. 1.

FIG. 3 illustrates a monitoring station 300, according to example aspects of the present disclosure. In the present aspect, a monitor housing unit 310 can be configured to house various components of the monitoring system 100 (shown in FIG. 1) and can be located at the monitoring station 300. The monitor housing unit 310 of the present aspect can comprise a housing enclosure 512 (shown in FIG.

5) defining an interior cavity 515 (shown in FIG. 5) and a housing door 314 configured to cover an open end 517 (shown in FIG. 5) of the housing enclosure 512. In some aspects, the monitor housing unit 310 can comprise a lock 315 for securing the housing door 314 in a closed configuration, as shown. Example aspects of the monitoring station 300 can further comprise the display device 130, which can be a computer monitor 330 in the present aspect, located proximate to the monitor housing unit 310. In other aspects, the display device 130 may not be located near the monitor housing unit 310. As shown, the thermographic video 125 captured by the thermal imaging camera 120 (shown in FIG. 1) can be displayed on the display device 130 for ease of viewing by a user. In the present aspect, multiple thermographic videos 125 captured by multiple thermal imaging cameras 120 can be displayed on the single computer monitor 330 for viewing multiple fields of view 230 (shown in FIG. 2) or regions of interest 235 (shown in FIG. 2) at once. A display device cable, such as a display device HDMI cable 316, can connect the monitor housing unit 310 to the display device 130, as described in further detail below. For example, the HDMI cable 316 can be configured to engage an HDMI port 816 (shown in FIG. 8) of monitor housing unit 310. Furthermore, in the present aspect, a keyboard cable 318 can connect the monitor housing unit 310 to a keyboard 320, and a mouse cable 322 can connector the monitor housing unit 310 to a mouse or mousepad 324. In some aspects, as shown, the monitor housing unit 310 can be mounted to a wall 350 and the display device 130 can be configured to rest on a support surface, such as a table top 360 or desktop. In other aspects, the display device 130 can be incorporated with the monitor housing unit 310 (e.g, mounted externally to the housing enclosure 512 or housing door 314 or mounted within the interior cavity 515), can be mounted to the wall 350, or can be oriented at any other suitable location. Furthermore, in other aspects, the monitor housing unit 310 can be configured to rest on a support surface or can be oriented at any other suitable location.

FIG. 4 is a color photograph showing a still image 425 of the thermographic video 125 or image that can be displayed on the display device 130 (shown in FIG. 1), according to example aspects of the present disclosure. In example aspects, the color scale 440 can be displayed over the thermographic video 125 at a right side 427 of the image 425, though in other aspects, the color scale 440 can be displayed elsewhere over the thermographic video 125. In the present aspect, warmer, brighter colors (e.g., red, yellow, orange) can indicate warmer temperatures, while cooler, darker colors (e.g., blue, purple, black) can indicate cooler temperatures. In other aspects, any colors can be used to indicate varying temperatures. Furthermore, in the present aspect, the maximum and minimum temperatures 450,455 detected in the field of view 230 (shown in FIG. 2) (or the region of interest 235, shown in FIG. 2) captured by the thermal imaging camera 120 (shown in FIG. 1), as well as the average temperature 460 detected in the field of view 230, can be displayed over the thermographic video 125 at an upper left corner 429 of the image 425. Other aspects may or may not comprise the color scale 440 and/or the maximum, minimum, and average temperatures 450,455,460 shown on the display device 130. Furthermore, other aspects may comprise additional information shown on the display device 130.

One or more of the cryogenic storage containers 115 can be within the field of view 230 captured by the thermal imaging camera 120. For example, in the present aspect, five of the cryogenic storage containers 115a,b,c,d,e can be captured by the camera 120 and shown in the thermographic video 125; however, in other aspects, more or fewer cryogenic storage containers 115 may be in the field of view 230. As shown, each of the cryogenic storage containers 115a, c,d,e are displayed as a purple color, which can indicate that each of the cryogenic storage containers 115a,c,d,e can be around the same temperature. In the present aspect, the purple color of the cryogenic storage containers 115a,c,d,e can also indicate that the outer walls 119 of the containers 115a,c,d,e are within a desired temperature range. However, the cryogenic storage container 115b is displayed as a black color, which can indicate that the outer wall 119 of the cryogenic storage container 115b is at a much lower temperature than the other cryogenic storage containers 115a, c,d,e. If the temperature of the cryogenic storage container 115b is at or below the low trigger temperature (or at or above the high trigger temperature in some aspects), the alarm unit 150 (shown in FIG. 1) can activate the alert (e.g., audio alert 154, visual alert 152, communication alert 156, or a combination thereof, as shown in FIG. 1).

Figure 5:
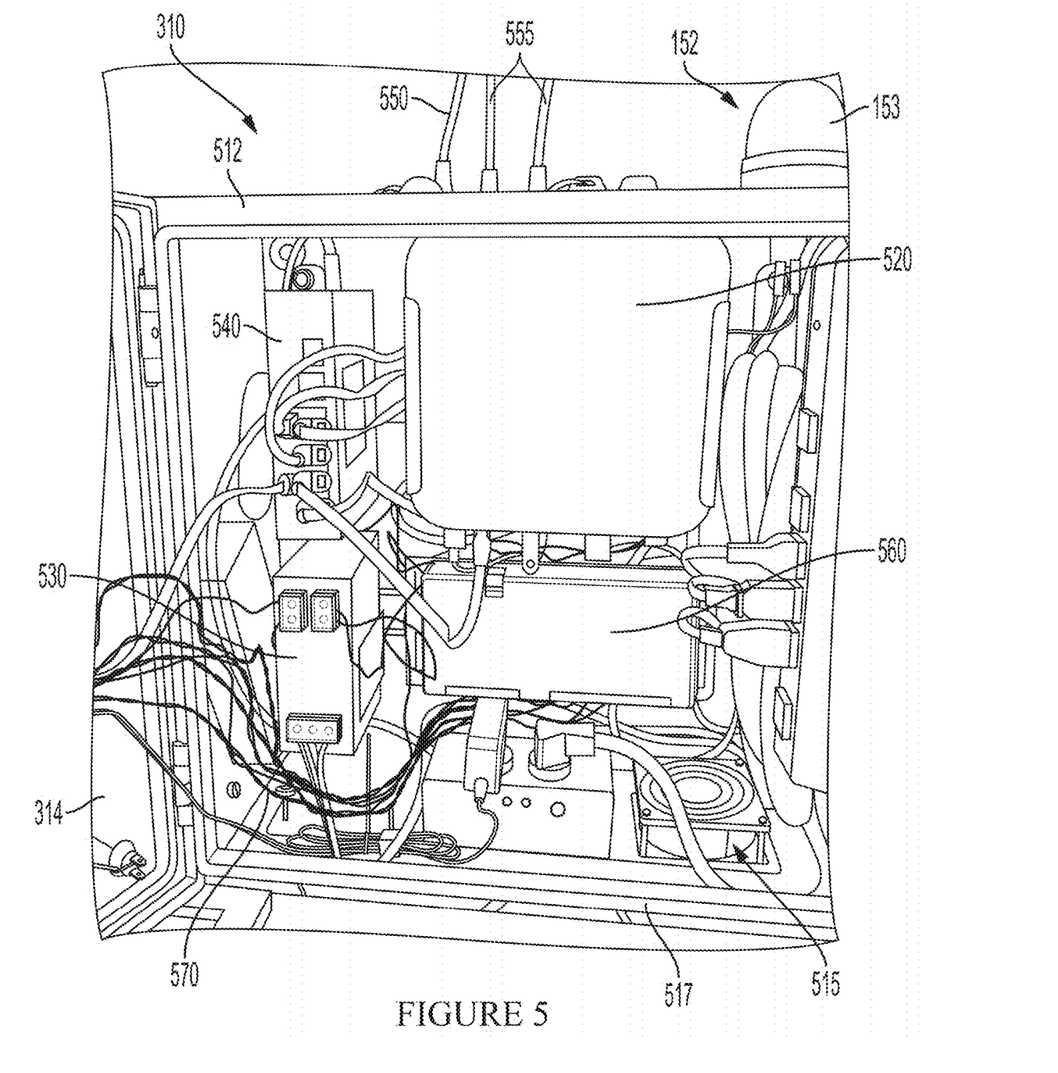
FIG. 5 is a front view of an interior cavity of the monitor housing unit of FIG. 3.

FIG. 5 illustrates the housing door 314 of the monitor housing unit 310 in an open configuration for visibility into the interior cavity 515 of the monitor housing unit 310. As shown, the monitor housing unit 310 can be configured to contain various components of the monitoring system 100 (shown in FIG. 1) within the interior cavity 515. For example, in the present aspect, a computer 520 comprising the processing unit 140 (shown in FIG. 1) can be received within the monitor housing unit 310. The computer 520 can be configured to run a video processing software for sending the thermographic video 125 (shown in FIG. 1) or image to the display device 130 (shown in FIG. 1). The video processing software can also be configured to send the thermographic video 125 or image to the internet-enabled device 160 (shown in FIG. 1) or network-connected device for remote viewing through a web page, mobile app, or the like. In example aspects, a power converter 530 can be provided, which can be configured to convert the type of electrical energy or adjust the voltage of electrical energy between various components of the monitoring system 100.

Furthermore, as described above, in example aspects, power can be sent to the thermal imaging camera 120 (shown in FIG. 1) by the POE switch 540 through the Ethernet cable 550. Furthermore, signals representative of temperatures detected by the thermal imaging camera 120 can be transferred through the Ethernet cable 550 to the computer 520 and/or the alarm unit 150. According to some example aspects, the signals representing temperature information sent by the thermal imaging camera 120 can comprise both visual data and temperature data. The visual data can contain the thermographic video 125 or image and can be sent to the computer 520, wherein it can be processed through the video processing software for display on the display device 130 (shown in FIG. 3). In example aspects, the video processing software can transfer the thermographic video 125 to the display device through the display device HDMI cable 316 (shown in FIG. 3). The temperature data can comprise specific external temperature values of the cryogenic storage containers 115 and can be sent to the alarm unit 150, and the circuitry of the alarm unit can process the temperature data to determine whether the detected temperatures are within a normal temperature range. In some example aspects, the monitoring system 100 can be configured to translate the signals sent by the thermal imaging camera 120 through the Ethernet cable 550 so that the alarm unit 150 (shown in FIG. 1) can understand the signals. As shown, in the present aspect, a digital input and output (I/O) device 560 can be provided for translating the signals as needed. For example, the digital I/O device 560 can translate the signals into binary signals, 4-20 mA signals, MODBUS signals, or any other signal type that can be understood by the alarm unit 150. In other aspects, the type of signals sent by the thermal imaging camera 120 through the Ethernet cable 550 may be understandable by the alarm unit 150 without translation, and in such aspects, the monitoring system 100 may not comprise the digital I/O device 560 or the digital I/O device 560 can be bypassed. For example, in a particular aspect, the thermal imaging camera 120 can be configured to send MODBUS signals through the Ethernet cable 550, and the MODBUS signals can be understood by the alarm unit 150 without translation. In still other aspects, the monitoring system 100 may not comprise the alarm unit 150, and the computer 520 can be configured to run an alarm software program, which can process the signals received from the thermal imaging camera 120 and can trigger an alert when necessary (e.g., the audio alert 154, visual alert 152, and/or communication alert 156, etc., as shown in FIG. 1). As shown, in the present aspect, additional Ethernet cables 555 can be provided, which can connect the monitor housing unit 310 to additional thermal imaging cameras 120.

As shown, in some example aspects, the strobe light 153, or another visual indicator, can be mounted externally to the monitor housing unit 310. The strobe light 153 can be mounted externally so that the visual alert 152 can be seen when the housing door 314 is in the closed configuration, as shown in FIG. 3. Furthermore, alarm unit wiring 570 can be configured to connect the alarm unit 150 (shown in FIG. 6) to both of the power converter 530 and the digital I/O device 560. The alarm unit wiring 570 can be configured to transfer the translated signals from the digital I/O device 560 to the alarm unit 150.

Figure 6:
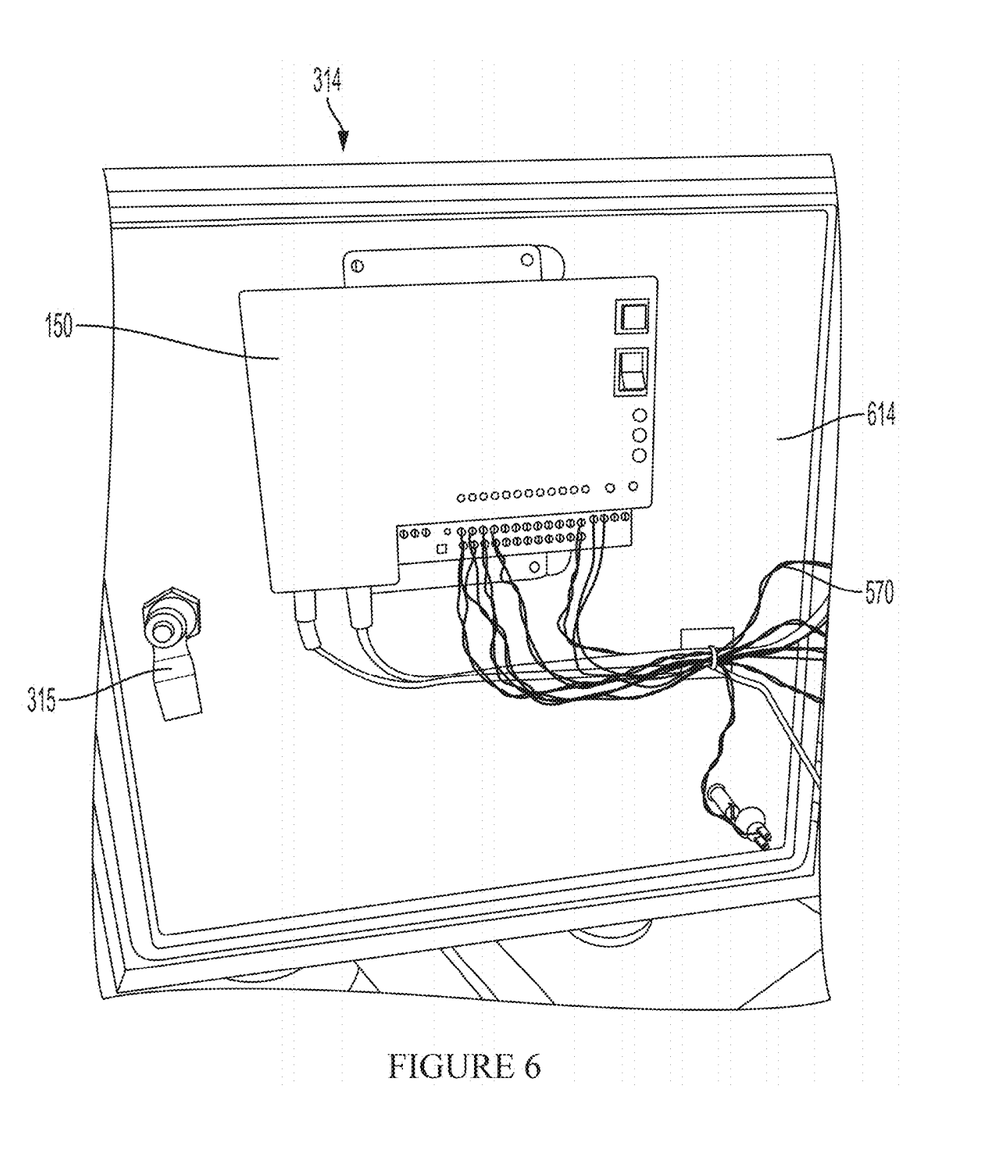
FIG. 6 is a rear view of a housing door of the monitor housing unit of FIG. 3.

As shown in FIG. 6, in example aspects, the alarm unit 150 can be mounted to an inner surface 614 of the housing door 314. In other aspects, the alarm unit 150 can be mounted elsewhere within the interior cavity 515 (shown in FIG. 5) of the monitor housing unit 310 or may be external to the monitor housing unit 310. In the present aspect, if an external temperature of any of the cryogenic storage containers 115 (shown in FIG. 1) monitored by the thermal imaging camera 120 (shown in FIG. 1) falls to or below the low trigger temperature (or rises to or above the high trigger temperature), the alarm unit 150 can activate the strobe light 153 (shown in FIG. 5), and/or any other suitable alert (e.g., visual, audio, and/or communication alerts 152,154,156, shown in FIG. 1) to warn the user(s) of failure or impending failure of the cryogenic storage container 115. The user(s) can then take the necessary actions to save the biological samples or other temperature-sensitive materials, housed in the cryogenic storage container 115.

Figure 7:
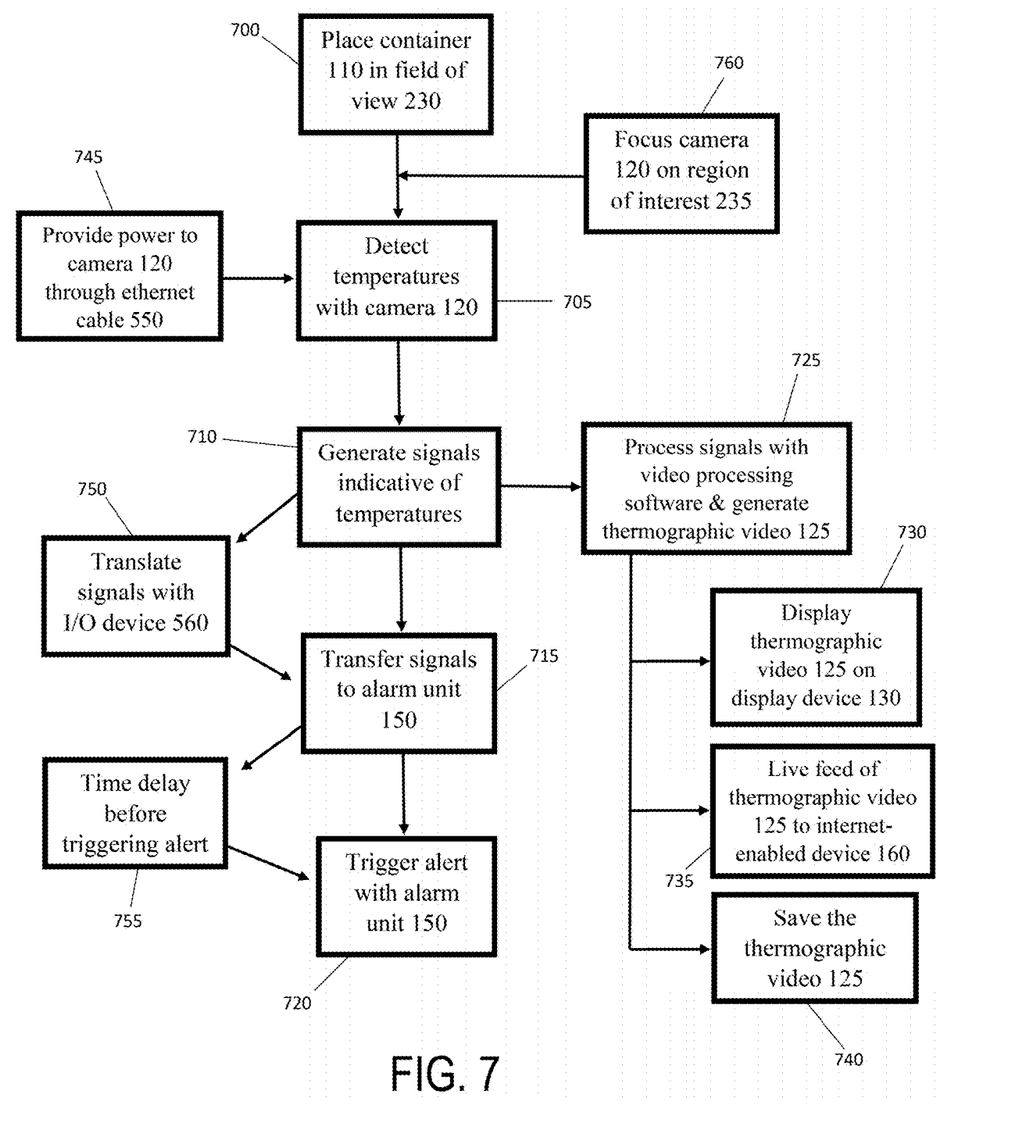
FIG. 7 is a flow chart illustrating a method of monitoring the cryogenic storage containers of FIG. 1 with the thermal monitoring system of FIG. 1.

FIG. 7 is a flow chart illustrating a method of monitoring the temperature-sensitive storage containers 110 (e.g., the cryogenic storage containers 115), according to an example aspect of the disclosure. Example aspects of the method can comprise a first step 700 of placing one of the temperature-sensitive storage containers 110 within the field of view 230 of the thermal imaging camera 120, and a next step 705 of measuring temperatures within the field of view 230 with the thermal imaging camera 120 by measuring infrared light with a sensor 122 of the camera 120 and processing the infrared light data with a camera software of the camera 120, wherein the temperatures can include the external temperature of the temperature sensitive storage container 110. The method can further comprise a step 710 of generating signals indicative of the detected temperatures with the thermal imaging camera 120, a step 715 of transferring the signals to the alarm unit 150, and a step 720 of activating an alert with the alarm unit 150 when the external temperature of the temperature-sensitive storage container 110 reaches or drops below the pre-selected low trigger temperature, or reaches or rises above the pre-selected high trigger temperature.

Example aspects of the method may further comprise a step 725 of processing the signals from the thermal imaging camera 120 with the video processing software and generating a thermographic video 125 with the video processing software, and a step 730 of displaying the thermographic video 125 on the display device 130, wherein the thermographic video 125 can comprise colors indicative of temperatures detected by the thermal imaging camera 120. The method may further comprise displaying on the display device 130 at least one of the maximum temperature 450, minimum temperature 455, and average temperature 460 detected by the thermal imaging camera 120. Some aspects of the method can further comprise a step 735 of sending a live feed of the thermographic video 125 to an internet-enabled device 160 to allow for remote viewing of the thermographic video 125. The method can further comprise a step 740 of saving a copy of the thermographic video 125 to a network or electronic device, such as the computer 520, and accessing the saved copy of the thermographic video 125 at a later time in some aspects. Example aspects of the method can further comprise a step 745 of providing power to the thermal imaging camera 120 through the ethernet cable 550, wherein the injection of the power into the ethernet cable 550 can be controlled by the power over ethernet (POE) switch 540. According to example aspects, the method may further comprise a step 750 of translating the signals from the thermal imaging camera 120 with the (I/O) device 560 prior to transferring the signals to the alarm unit 150. In some aspects, activating an alert with the alarm unit 150 can comprise activating at least one of the visual alert 152, the audio alert 154, and the communication alert 156. Furthermore, in example aspects, activating the alert with the alarm unit 150 when the external temperature of the temperature-sensitive storage container 110 reaches or drops below a pre-selected low trigger temperature can comprise a step 755 of activating the alert only if the external temperature remains at or below the pre-selected low trigger temperature after the predetermined time delay. In some aspects, the method can also or alternatively comprise activating the alert with the alarm unit 150 when the external temperature of the temperature-sensitive storage container 110 reaches or rises above a pre-selected high trigger temperature, and in some aspects, activating the alert can comprise activating the alert only if the external temperature remains at or above the pre-selected high trigger temperature after the predetermined time delay. Some example aspects of the method can further comprise the step 760 of focusing the thermal imaging camera 120 on a region of interest 235 within the field of view 230 through the camera software. In other aspects, the thermal imaging camera 120 may be manually focused on the region of interest 235.

Figure 8:
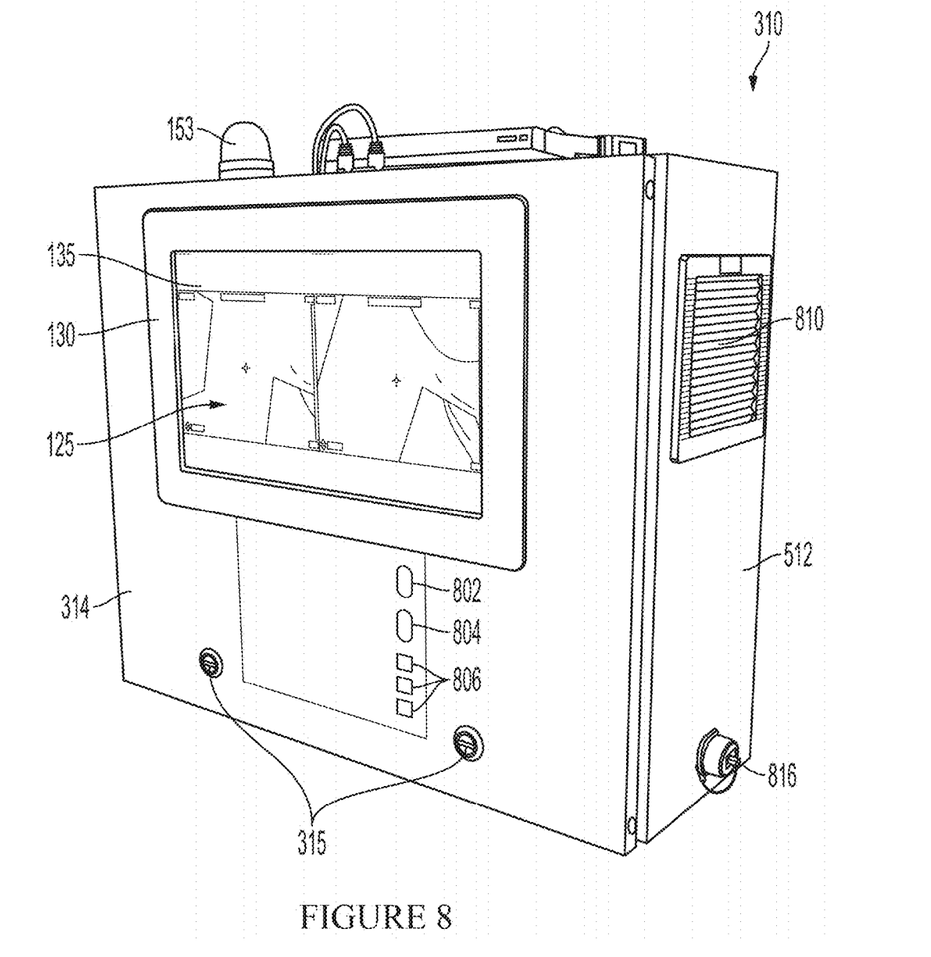
FIG. 8 is a front perspective view of the monitor housing unit according to another aspect of the present disclosure.

FIG. 8 is a front perspective view of the monitor housing unit 310 according to another example aspect of the present disclosure. The monitor housing unit 310 can comprise the housing enclosure 512 and the housing door 314. In example aspects, the housing enclosure 512 can comprise one or more vents 810 configured to allow warm or hot air to escape from the interior cavity 515 (shown in FIG. 5) into the surrounding environment. The housing door 314 is shown in the closed configuration, wherein the open end 517

(shown in FIG. 5) of the housing enclosure 512 can be covered by the housing door 314. In the present aspect, two of the locks 315 can be provided for securing the housing door 314 in the closed configuration. As shown, in some aspects, the display device 130, or one of multiple display devices 130, can be mounted to the monitor housing unit 310. For example, in the present aspect, the display device 130 can be mounted to the housing door 314, such that the thermographic video 125 or image shown on the display device 130 can be viewed from outside the monitor housing unit 310 with the housing door 314 in the closed configuration. According to example aspects, the display device 130 can be a TV screen 135, as shown, a computer monitor, a tablet, a mobile phone, or any other suitable electronic display device 130. In some aspects, the display device 130 can be externally mounted to the monitor housing unit 310, while in other aspects, the display device 130 may be mounted within an opening formed through the monitor housing unit 310, such that a portion of the display device 130 can be received within the interior cavity 515. In some example aspects, as shown, the housing door 314 can further comprise one or more switches 802,804 for turning various components of the thermal monitoring system 100 on and off. For example, the switches 802,804 can be configured to turn on and off the alarm unit 150, the computer 520, the thermal imaging camera 120, the digital I/O device 560, or any other component. Furthermore, in some example aspect, the housing door 314 may comprise indicator lights 806 (e.g., LEDs) configured to indicate the status of various aspects of the thermal monitoring system 100. For example, the indicator lights 806 may indicate whether the thermal imaging camera 120 is actively monitoring a temperature-sensitive storage container 110, whether an alert has been activated by the alarm unit 150, or can indicate any other status of the thermal monitoring system 100.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A thermal monitoring system for monitoring for vacuum failure in a cryogenic storage container, the thermal monitoring system comprising comprising:
   a cryogenic storage container comprising an external wall and an internal wall, wherein a cold cryogenic liquid is housed within the internal wall, and wherein a vacuum is formed between the external wall and the internal wall;
   a thermal imaging camera configured to measure temperatures within a region of interest, wherein the cryogenic storage container is oriented within the region of interest and the thermal imaging camera measures an external temperature of the outer wall of the cryogenic storage container, the thermal imaging camera further comprising camera software configured to generate a thermographic video of the external temperature;
   a display device displaying the thermographic video; and
   an alarm unit configured to activate an alert when the external temperature of the cryogenic storage container drops below a pre-selected trigger temperature indicative of a vacuum failure of the cryogenic storage container.

2. The thermal monitoring system of claim 1, further comprising an internet-enabled device configured to receive a live feed of the one of the thermographic video and thermographic image.

3. The thermal monitoring system of claim 1, wherein the alert comprises at least one of a visual alert, audio alert, and communication alert.

4. The thermal monitoring system of claim 3, wherein:
   the visual alert comprises a light;
   the audio alert comprises at least one of a horn and siren; and
   the communication alert comprises at least one of an email, text message, and phone call.

5. The thermal monitoring system of claim 1, further comprising a cable configured to transfer temperature data from the thermal imaging camera to the alarm unit.

6. The thermal monitoring system of claim 5, further comprising a power over Ethernet switch, wherein:
   the cable is an ethernet cable; and
   power is sent through the ethernet cable to the thermal imaging camera by the power over ethernet switch.

7. The thermal monitoring system of claim 1, wherein the thermal imaging camera comprises a sensor configured to detect infrared light within the region of interest, and the camera software is configured to process the detected infrared light to measure the temperatures within the region of interest.

8. The thermal monitoring system of claim 1, wherein:
   the thermal imaging camera is configured to generate signals indicative of the temperatures detected by the thermal imaging camera; and the thermal monitoring system further comprising a digital input and output device configured to translate the signals and to send the translated signals to the alarm unit.

9. The thermal monitoring system of claim 1, wherein the alarm unit is further configured to activate an alert when the external temperature of the cryogenic storage container rises above a pre-selected trigger temperature.

10. The thermal monitoring system of claim 9, wherein the monitor housing unit comprises a housing enclosure and a housing door, the housing enclosure defining an interior cavity and an open end, the housing door configured to cover the open end in a closed configuration, and to uncover the open end in an open configuration to allow access to the interior cavity.

11. A method of monitoring a cryogenic storage container for vacuum failure, the method comprising:
  placing a cryogenic storage container within a field of view of a thermal imaging camera, the cryogenic storage container comprising an external wall, an internal wall, and a vacuum formed therebetween;
  measuring temperatures within the field of view with the thermal imaging camera, wherein the temperatures include an external temperature of the cryogenic storage container;
  generating signals indicative of the detected temperatures with the thermal imaging camera;
  transferring the signals to the alarm unit; and
  activating an alert with an alarm unit when the external temperature of the cryogenic storage container drops below a pre-selected trigger temperature.

12. The method of claim 11, further comprising generating a thermographic video with camera software of the thermal imaging camera, and displaying the thermographic video on a display device, wherein the thermographic video comprises colors indicative of the temperatures measured by the thermal imaging camera.

13. The method of claim 12, further comprising displaying on the display device at least one of a maximum temperature, minimum temperature, and average temperature measured by the thermal imaging camera within the field of view.

14. The method of claim 13, further comprising sending a live feed of the thermographic video to an internet-enabled device to allow for remote viewing of the thermographic video.

15. The method of claim 12, further comprising saving the thermographic video and accessing the saved thermographic video at a later time.

16. The method of claim 12, further comprising visually monitoring the thermographic video for a change in color to identify temperature changes within the field of view that are indicative of a vacuum failure of the cryogenic storage container.

17. The method of claim 11, further comprising providing power to the thermal imaging camera through an ethernet cable, wherein injection of the power into the ethernet cable is controlled by a power over ethernet (POE) switch.

18. The method of claim 17, further comprising translating the signals with a digital input and output (I/O) device prior to transferring the signals to the alarm unit.

19. The method of claim 11, wherein activating an alert with an alarm unit when the external temperature of the cryogenic storage container drops below a pre-selected trigger temperature comprises activating the alert only if the external temperature remains below the pre-selected trigger temperature after a predetermined time delay.

20. The method of claim 11, further comprising focusing the thermal imaging camera on a region of interest within the field of view through a camera software program.

21. A thermal monitoring system for monitoring for vacuum failure in a cryogenic storage container, the thermal monitoring system comprising:
  a cryogenic storage container comprising an external wall, an internal wall, and a vacuum formed therebetween;
  a thermal imaging camera comprising a sensor and camera software, the sensor configured to detect infrared light within a field of view, wherein the cryogenic storage container is positioned within the field of view and the infrared light includes infrared light emitted by the external wall of the cryogenic storage container, the camera software configured process the infrared light data to measure an external temperature of the external wall; and
  an alarm unit configured to activate an alert when the external temperature of the cryogenic storage container drops below a pre-selected trigger temperature.

* * * * *